UNITED STATES PATENT OFFICE.

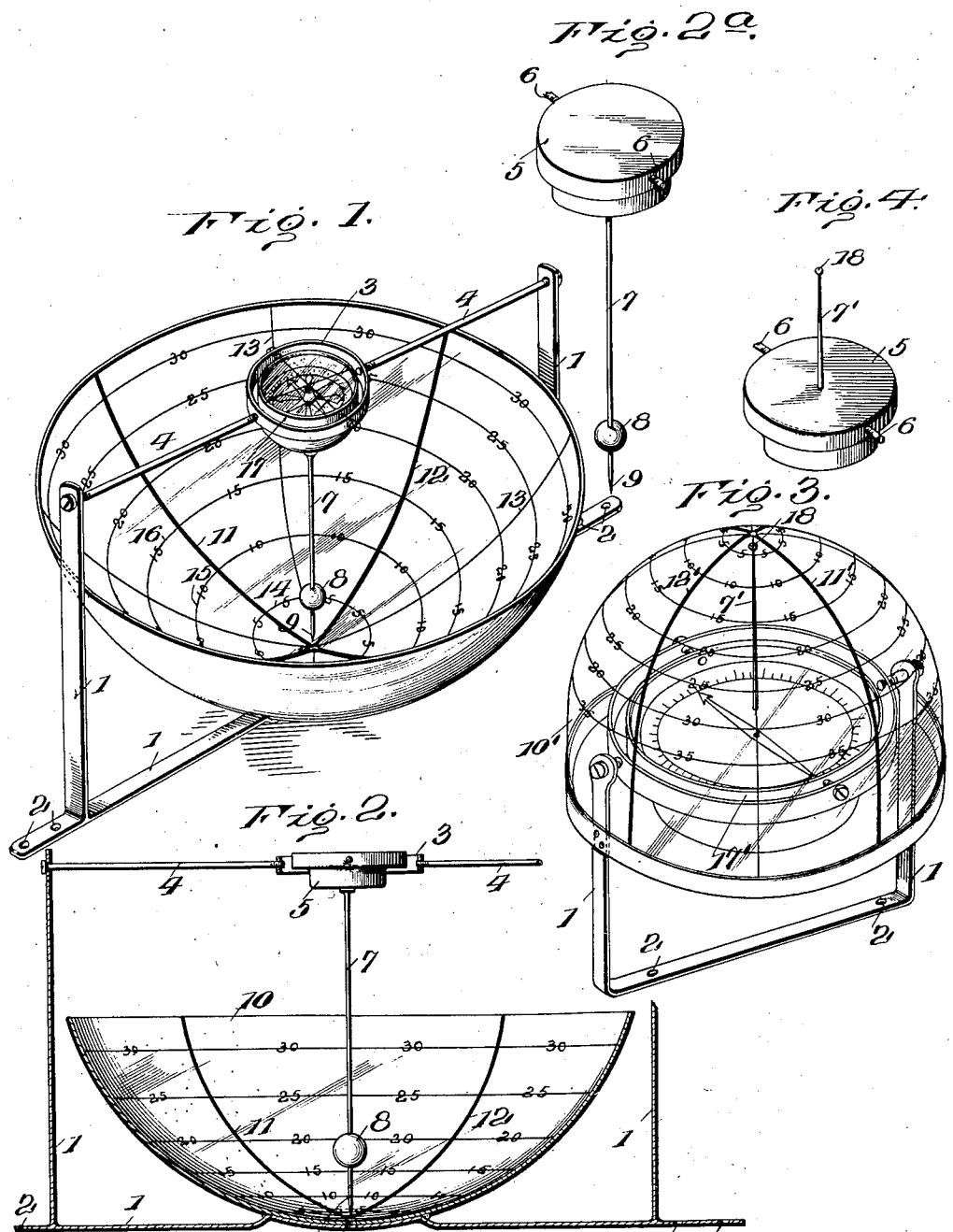

HENRY L. E. JOHNSON, OF WASHINGTON, DISTRICT OF COLUMBIA.

AEROPLANE COMPASS AND INCLINOMETER.

1,097,925.  Specification of Letters Patent.  Patented May 26, 1914.

Application filed November 12, 1912. Serial No. 730,976.

*To all whom it may concern:*

Be it known that I, HENRY L. E. JOHNSON, of Washington, District of Columbia, have invented a new and useful Improvement in Aeroplane Compasses and Inclinometers, which invention is fully set forth in the following specification.

This invention relates to improvements in means for determining the direction of movement of an aeroplane and its inclination from the normal or horizontal plane, and has for its objects to enable the aviator to determine at a glance the direction in which the aeroplane is traveling, and whether or not the aeroplane is inclined from the normal or horizontal plane, and if so, to determine the angle or degree of inclination and the direction of the inclination; that is, whether the aeroplane is inclined from the normal or horizontal plane in any direction, either forward, rearward, laterally, or from points between these cardinal points, such as diagonally or from corner to corner.

It is of great importance that the aviator should be able to lay his course in any desired or given direction, and maintain that direction when traveling from point to point, and this is frequently a matter of much difficulty, since the aviator's view of the earth may be obscured by darkness at night, clouds, smoke, mist or rain, or he may be unfamiliar with the territory over which he is traveling. If, however, he knows the compass direction which he wishes to take, and lays his course in that direction, it is only necessary that he hold the aeroplane on its course, and this he is enabled to do by the present invention, in which a compass is employed for this purpose.

It is of the utmost importance that the aviator should know at all times the angle of inclination and the direction of inclination of the aeroplane, in order that he may maintain the angle and direction of inclination in the position necessary to accomplish any desired result. And in case of any departure from the desired angle or direction of inclination, it is highly desirable that he should be immediately informed thereof, in order that the same may be corrected. This not only tends to greater accuracy and safety in the manipulation of the aeroplane, but is a matter of vital importance in preventing accident, since it enables the aviator to correct any departure from the desired angle of inclination before the same has reached the point where the machine would get beyond the aviator's control and fall to the earth.

By the present invention, I provide means whereby the slightest departure from the normal or horizontal plane will at once be indicated to the aviator, and the direction of such inclination be indicated invariably and with absolute precision.

In my invention, I provide a universally mounted plumb or pendulous body, which, by the action of gravity, will always stand normal or perpendicular to the horizontal plane, which body is provided with an indicating point, operating in connection with a universal scale mounted on and turning with the aeroplane, which scale is so constructed that it will disclose not only the angle which the aeroplane itself may assume with relation to the horizontal plane, but will also indicate the direction of inclination, so that the aviator sees at once, and at a glance, just where the highest and the lowest points of his aeroplane are when the same is inclined from the horizontal.

I preferably construct the plumb or pendulous body in the form of a wire or small rod provided with a suitable weight, the wire or rod being carried on a universal mounting, such as a gimbal mounting, for example, secured to the aeroplane, and this plumb or pendulous body has an indicator point, which always points either straight upward or straight downward, according to the form of construction, no matter what the angle of inclination of the aeroplane itself may be. Associated with this pointer is my universal scale, which, preferably, is in the form of a curved surface, which may be, and usually is, a segment of a hollow sphere. This curved surface has marked thereon, and extending at right angles thereto, two cardinal lines, one of which extends fore and aft of the aeroplane when the device is mounted thereon, and parallel with the medial fore and aft line of the machine, and the other of which extends at right angles to said medial fore and aft line. In addition to said cardinal lines, I provide other lines extending from the point of intersection of the cardinal lines, and at given and regular angles to said cardinal lines. Furthermore, with the center of the universal mounting of the pointer as a center, I strike on said curved surface parallel circles at regular, angular distances from each other. These several lines thus inscribed upon the curved surface divide the same precisely as the lines of latitude and of longitude divide a sphere. The lines corresponding to the lines of latitude are so spaced that they will disclose, in conjunction with the plumb pointer, the angle of inclination from the normal or horizontal of the aeroplane upon which the scale is mounted, and the lines corresponding to lines of longitude disclose the direction of such inclination. Said scale is rigidly fixed to and turns with the aeroplane in every direction. The plumb pointer may be arranged to point either upward or downward. When the same points downward, the scale will be located beneath the pointer with its concave side upward, and with the indicating lines above mentioned on its concave surface. When the plumb pointer points upward, the said scale is placed above the pointer with its concave side downward, and in this instance the said surface is preferably of any suitable transparent material, such as glass, with the scale lines either on the concave or convex side thereof, but preferably on the concave side, in order to protect the same from injury.

The universal mounting for the plumb pointer may be of any suitable character, such, for example, as a gimbal mounting, and may be in the form of a suitable body mounted in gimbals, to the end that the same may always remain in a horizontal position. This body is suitably weighted so as to insure its always maintaining (under the action of gravity) a horizontal position with the pointer normal (perpendicular) to the horizontal plane. Such weighting may be accomplished by placing the center of gravity of the body itself below the plane of the mounting, or a weight, such as a lead ball, may be attached, for example, to the wire or rod constituting the pointer. In one of the mechanical expressions of the inventive idea, such body may be in the form of a compass mounted on gimbals, and having a vertically extended pointer secured thereto, said compass having the weight thereof so disposed as to place the center of gravity well below the horizontal plane extending through the gimbals. One material advantage that is secured by mounting the plumb pointer on a compass resides in the fact that the aviator has at all times his inclinometer and his compass located immediately before him at the same point, and at a single glance may determine not only his compass direction of travel, but the angle and direction of inclination of the aeroplane. Moreover, this contributes greatly to the compactness of the device as a whole.

The inventive idea involved in my invention is capable of receiving a variety of mechanical expressions, some of which, for the purpose of illustrating the invention, are shown in the accompanying drawings. Said drawings, however, are for the purpose of illustrating the invention only, and are not to be taken as defining the limits of the invention, reference being had to the following specification and the appended claims for this purpose.

Referring to the drawings—Figure 1 is a perspective view showing the compass and inclinometer combined, with the pointer of the inclinometer extending downward, and the scale thereof with its concave surface turned upward; Fig. 2 is a transverse section through my inclinometer, with the plumb pointer mounted on a body, such as a disk, said pointer pointing downward and the scale with its concave surface upward; Fig. 2ª is a perspective view of the plumb pointer of Fig. 2 and the disk body upon which the same is mounted; Fig. 3 is a perspective view of my combined compass and inclinometer, with the scale mounted with its concave side downward and the pointer mounted on the compass and directed upward; and Fig. 4 is a perspective view of a disk form of mounting for the plumb pointer when the scale is mounted concave surface downward and the inclinometer is used without a compass.

Referring to the drawings, 1 indicates a suitable frame capable of being attached, as by screws through the openings 2, to any desired or suitable part of the aeroplane, and 3 is a ring supported to turn in the standards of the frame 1 on the trunnions or rods 4. Within the ring 3 is mounted a body 5 of any suitable material and construction, having trunnions 6, 6, taking bearing in the ring 3 at points in a line at right angles to the points where the trunnion rods 4, 4, are secured to said ring. As shown in Figs. 2, 2ª and 4, this body is in the form of a disk whose trunnions 6, 6, are well above the center of gravity of said body. A plumb rod 7 depends from the body 5 in the form shown in Figs. 2 and 2ª, and may be, and preferably is, provided with a weight 8, in the form of a lead ball, the plumb rod 7 being sharpened below the ball to form the pointer 9. It will be seen that no matter how or in what direction the aeroplane may be inclined from the horizontal, the plumb rod 7 (Figs. 1 and 2) will always remain vertical, and the pointer 9 will point vertically downward.

Mounted on the aeroplane so as to turn therewith at all times is the concave scale 10, which, as here shown, is mounted directly on, and rigidly secured to, the frame 1. The surface of this concave scale is preferably a segment of a hollow sphere, whose concave surface is parallel with the arc described by the pointer. Referring to Figs. 1 and 2, this concave surface has drawn thereon in any suitable way two cardinal lines 11 and 12. The cardinal line 11 is in a plane parallel with the fore and aft medial plane of the aeroplane when the device is mounted in position thereon, and the cardinal line 12 is at right angles to the cardinal line 11, the two lines intersecting at the pole of the segment constituting the concave surface 10. The portion of the concave surface lying between the cardinal lines is divided by other lines 13, 13, into uniform portions, and there is drawn on the concave surface a series of parallel circles 14, 15, 16, and so on, struck from the center of the gimbal mounting and at regular angular distances apart, as 5°, 10°, 15°, etc.

Instead of the body 5 being in the form of a disk, as shown in Figs. 2 and 2ª, it may be, and preferably is, in the form of a compass 17 (Fig. 1). The entire device may, if desired, be suitably illuminated by any of the ordinary devices employed for illuminating compasses on shipboard, but as such illuminating device forms no part of the present invention, it is not shown on the drawings.

The operation of the device thus far described is as follows:—Referring to Fig. 1, the device is attached to the aeroplane with the cardinal line 11 in a plane parallel with the medial fore and aft vertical plane extending through the aeroplane when the same is in normal or horizontal position, in which position the pointer of the plumb rod 7 will point to the pole or zero position indicated in Figs. 1 and 2. The position of the device upon the aeroplane is preferably immediately in front of the aviator, where he can readily observe the same at a glance, and with the construction shown in Fig. 1, the direction of travel or flight of the aeroplane is at once determined by observing the compass, and any departure from the horizontal in the inclination of the machine will be at once indicated by the pointer 9, in conjunction with the scale on the concave surface 10, which will not only indicate the degree of inclination, but will also indicate the direction of inclination, and which is the lowest point or part of the aeroplane when so inclined. This enables the aviator to change the inclination, if desired, or to know when the machine is being held at any desired inclination. No matter where may be the lowest point of the aeroplane, or the degree of inclination or dip,—both will be instantly and absolutely indicated by the position of the pointer 9 with relation to the scale on the concave surface.

Referring now to Fig. 3, the compass 17' is mounted on gimbals in the frame 1, after the manner shown in Fig. 1, and coöperating therewith is a plumb rod or pointer 7' pointing upward. This pointer 7' may be mounted upon the compass in any suitable manner, as by drilling a hole in the glass cover of the compass or otherwise. Secured to the frame 1, with its concave side downward, is a segment of a hollow sphere 10', preferably of glass or other transparent material, having the cardinal lines 11' and 12' located with respect to the aeroplane the same as the cardinal lines 11 and 12 of Fig. 1, and there are also provided the same radial and circular lines heretofore described in connection with Figs. 1 and 2. These several lines may be either upon the exterior or interior of the transparent segment 10', but preferably are upon the interior thereof, with the segment 10' mounted so that the pointer 7' points to the pole or zero angle of the scale when the aeroplane is in the normal or horizontal position. Instead of the compass 17', shown in Fig. 3, there may be employed the body 5 of Fig. 4, with the indicating pointer or rod 7' mounted thereon, and in both of the constructions shown in Figs. 3 and 4, said pointer may, and preferably does, have a small ball or tip 18, preferably of some prominent color, as red, in order that it may quickly attract the eye, and its position thus quickly and accurately located. The operation of this embodiment of the invention is precisely the same as that of the embodiments illustrated in Figs. 1 and 2. The compass indicates the direction of flight of the aeroplane, and the pointer 7', in conjunction with the scale, indicates the angle of inclination, and the highest point of inclination, the pointer 7', always pointing toward that part of the scale which corresponds to the highest part of the inclined aeroplane.

It will thus be seen that the compass at all times indicates the direction of flight, thus enabling the aviator to hold his aeroplane on its course at all times (day or night), even when lost in clouds, fog or mist, or under other obscure conditions of sight; that the inclinometer accurately and automatically indicates the exact angle of inclination or dip in any direction, thus permitting prompt recognition by the aviator during flight of any variations in the angle of inclination, and adjustment or recovery when desired, before dangerous inclination produces lost equilibrium or control.

It will be understood, of course, that the entire device may be suitably inclosed in a box or casing to protect it from the action of the wind or weather and from injury, and that modifications and variations in the proportions, materials and adjustments of the several parts, within the confines of the appended claims, may be made without departing from my invention.

While I have herein described my invention in connection with its use on an aeroplane, it will, of course, be understood that it may be advantageously used in connection with any support or platform where it is desirable to have indicated any deviation from the horizontal, as, for example, on the deck of a vessel, where it is desired to so place the freight in the vessel as to cause her to normally rest on a level keel.

What is claimed is:—

1. In a device of the character described, the combination of a gravity-controlled pointer mounted on a compass having universal bearings, and a member having a concave surface opposite said pointer having a scale indicating relative angular movement of said pointer and surface.

2. In a device of the character described, the combination of a gravity-controlled pointer mounted on a compass having universal bearings, with a member having a concave surface opposite said pointer having a scale thereon, indicating relative angular displacement of said pointer and surface and the direction of such displacement.

3. In a device of the character described, the combination of a gravity-controlled pointer mounted on a compass hung in universal bearings, with a member having a concave surface having two cardinal lines thereon intersecting each other at right angles and at a point vertically opposite said pointer when the device is on a horizontal platform.

4. In a device of the character described, the combination of a body hung in universal bearings and a gravity-controlled vertical pointer secured to said body, with a member having a concave surface in the form of a segment of a sphere vertically opposite said pointer, said surface having thereon a series of equally spaced lines radiating from a pole or zero angle of said sphere and also having a series of equally spaced parallel circles struck on said surface with said pole or zero point as a center.

5. In a device of the character described, the combination of a compass hung in universal bearings whereby the said compass is maintained horizontal by the action of gravity, and a vertically projecting pointer rigidly secured to said compass, with a member having a concave surface in the form of a segment of a sphere having its pole or zero point opposite said pointer when the device is on a horizontal platform, said surface being provided with two cardinal lines intersecting each other at right angles and at said pole or zero point on said surface.

6. In a device of the character described, the combination of a compass hung in gimbal bearings whereby the compass will maintain a horizontal position under the action of gravity, and a vertically projecting pointer rigidly secured on said compass, with a member having a concave surface in the form of a segment of a sphere whose pole or zero angle is opposite the pointer when the device is on a horizontal platform, said surface being provided with a series of equally spaced lines radiating from said pole and with a series of equally spaced circular lines struck on said surface with said pole as a center.

In testimony whereof I have signed this specification in the presence of two subscribing witnesses.

HENRY L. E. JOHNSON.

Witnesses:
S. T. CAMERON,
W. B. KERKAM.